United States Patent [19]

Kim

[11] Patent Number: 5,199,018

[45] Date of Patent: Mar. 30, 1993

[54] SYSTEM FOR INSERTING A SYNCHRONIZING PATTERN IN DIGITAL AUDIO DATA ON AN OPTICAL DISK

[75] Inventor: Dae Y. Kim, Seoul, Rep. of Korea

[73] Assignee: Gold Star Co., Ltd., Rep. of Korea

[21] Appl. No.: 671,492

[22] Filed: Mar. 19, 1991

[30] Foreign Application Priority Data

Mar. 20, 1990 [KR] Rep. of Korea ............... 3744/1990

[51] Int. Cl.⁵ ................... H04N 5/76; G11B 5/09; H03K 17/00
[52] U.S. Cl. .............................. 369/59; 360/51; 328/72
[58] Field of Search .......... 369/59, 48; 375/116, 375/106, 110; 360/51; 328/72, 63, 55

[56] References Cited

U.S. PATENT DOCUMENTS

| | | | |
|---|---|---|---|
| 4,357,702 | 11/1982 | Chase et al. | 360/26 |
| 4,641,326 | 2/1987 | Tomisawa | 375/108 |
| 4,667,318 | 5/1987 | Sugiyama et al. | 360/51 |
| 4,825,403 | 4/1989 | Gershenson et al. | 360/51 |
| 4,984,249 | 1/1991 | Long et al. | 375/116 |

FOREIGN PATENT DOCUMENTS 0144813 6/1985 European Pat. Off. .
0242121 10/1987 European Pat. Off. .

*Primary Examiner*—Aristotelis Psitos
*Assistant Examiner*—Nabil Hindi
*Attorney, Agent, or Firm*—Ostrolenk, Faber, Gerb & Soffen

[57] ABSTRACT

A system for inserting a synchronizing pattern in digital voice data on an optical disk comprising a synchronizing pattern input controller for generating the synchronizing pattern in accordance with a synchronizing pattern insert signal outputted from a microprocessor to control the serial data and the beat clock from the optical disk digital signal processor and indicate that inserting the synchronizing pattern has been completed. The synchronizing pattern input controller includes a clock generator, a timing controller, a counting unit, a synchronizing pattern generator, a control signal generator, and a switching unit. Therefore, the data having no synchronizing pattern such as the digital voice data loaded on the optical disk, which is outputted from the optical disk digital signal processor, can be normally inputted to the optical disk ROM decoder by the synchronizing pattern generated externally. Also, the synchronizing pattern can be inputted to the optical disk ROM decoder before the serial data stream is outputted from the optical disk digital signal processor.

8 Claims, 3 Drawing Sheets

SYSTEM FOR INSERTING A SYNCHRONIZING PATTERN IN DIGITAL AUDIO DATA ON AN OPTICAL DISK

BACKGROUND OF THE INVENTION

The present invention relates to an optical disk reproducing apparatus, more particularly, to a system for inserting a synchronizing pattern in digital audio data on the optical disk, whereby data having no synchronizing pattern such as digital audio data loaded on the optical disk, which is outputted from a digital signal processor, can be normally inputted to an optical disk ROM decoder by the synchronizing pattern generated externally.

In a conventional optical disk reproducing apparatus, an optical disk digital signal processor processes digital audio data on the optical disk read from a disk pickup and outputs a predetermined data in serial format to an optical disk ROM decoder which then inputs the serial data, only after it detects 12 bytes of synchronizing patterns FF, OO, FF, FF, FF, FF, FF, FF, FF, FF, OO, FF in the serial data.

However, the optical disk ROM decoder can input the serial data outputted from the optical disk digital signal processor, with 12 bytes of synchronizing pattern existing in the data format recorded on a disk of an optical disk player. Thus, the data can not be inputted to the optical disk ROM decoder in an appropriate timing, since the digital signal data format on the optical disk doesn't include this synchronizing pattern.

SUMMARY OF THE INVENTION

Therefore, an object of the present invention is to provide a system for inserting a synchronizing pattern in digital audio data on an optical disk, whereby the synchronizing pattern can be inputted to an optical disk ROM decoder before a serial data stream is outputted from an optical disk digital signal processor.

In accordance with the present invention, the object can be accomplished by providing a system for inserting a synchronizing pattern in digital audio data on an optical disk comprising an optical disk digital signal processor for signal-processing digital audio data on the optical disk read from a disk pickup to output a serial data, a beat clock, a sync signal, and a left and right clock; a synchronizing pattern input controller for generating the synchronizing pattern in accordance with a synchronizing pattern insert signal outputted from a microprocessor to control the serial data and the beat clock from said optical disk digital signal processor and indicate that inserting the synchronizing pattern has been completed; and an optical disk ROM decoder for detecting 12 bytes of synchronizing pattern generated from said synchronizing pattern input controller to decode the serial data and the beat clock.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
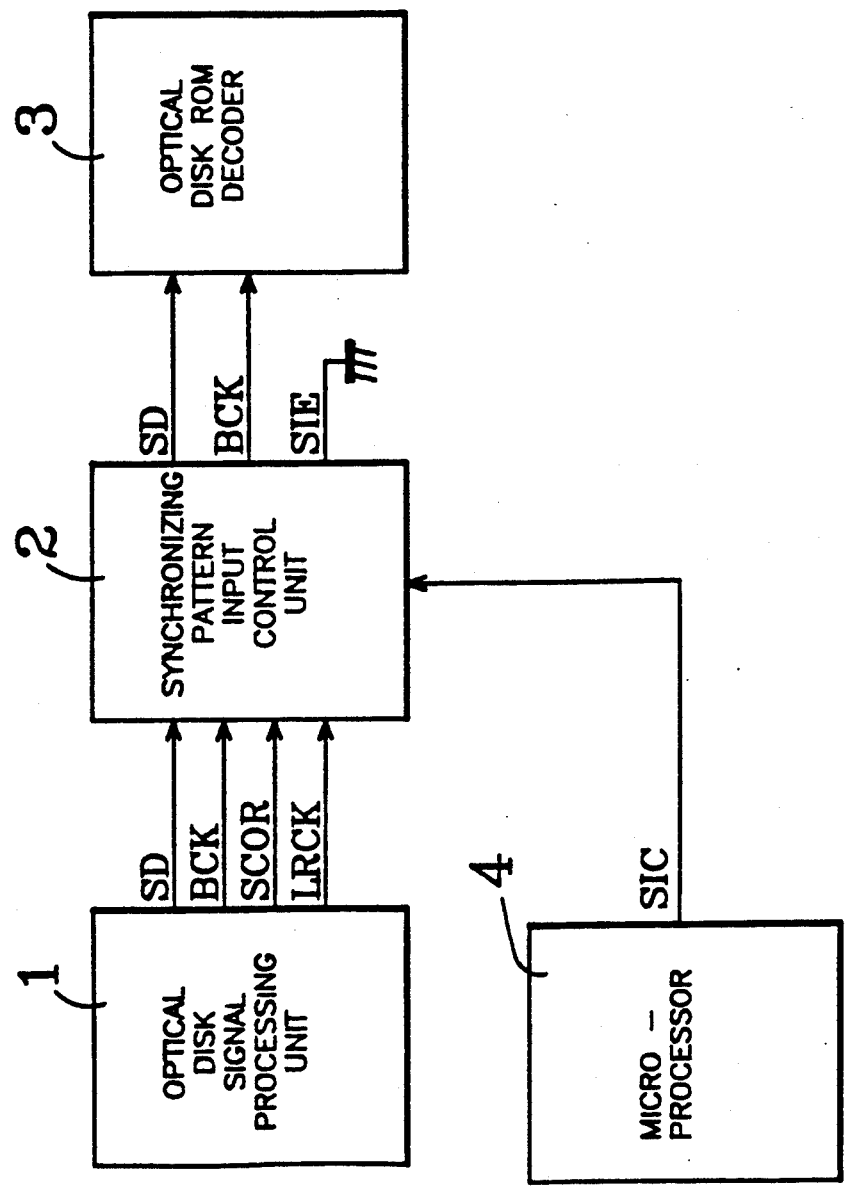
FIG. 1 is a view showing an arrangement of a system for inserting a synchronizing pattern in digital audio data on an optical disk in accordance with the present invention.

FIG. 1 is a view showing an arrangement of a system for inserting a synchronizing pattern in digital audio data on an optical disk in accordance with the present invention. As shown in the drawing, the system of the present invention comprises an optical disk digital signal processor 1 for inputting digital audio data CD-DA on the optical disk outputted from a disk pickup and for processing the input digital audio data to output a serial data SD, a beat clock BCK, a sync signal SCOR, and a left and right clock LRCK; a synchronizing pattern input controller 2 for inputting the serial data SD, the beat clock BCK, the sync signal SCOR, and the left and right clock LRCK outputted from the optical disk digital signal processor 1 and for generating a synchronizing pattern in accordance with a synchronizing pattern insert signal SIC outputted from a microprocessor 4 to control the serial data SD and the beat clock BCK and indicate that inserting the synchronizing pattern is completed; and an optical disk ROM decoder 3 for detecting 12 bytes of synchronizing pattern FF, OO, FF, FF, FF, FF, FF, FF, FF, FF, OO, FF generated from the synchronizing pattern input controller 2 to decode the serial data SD and the beat clock BCK.

Figure 2:
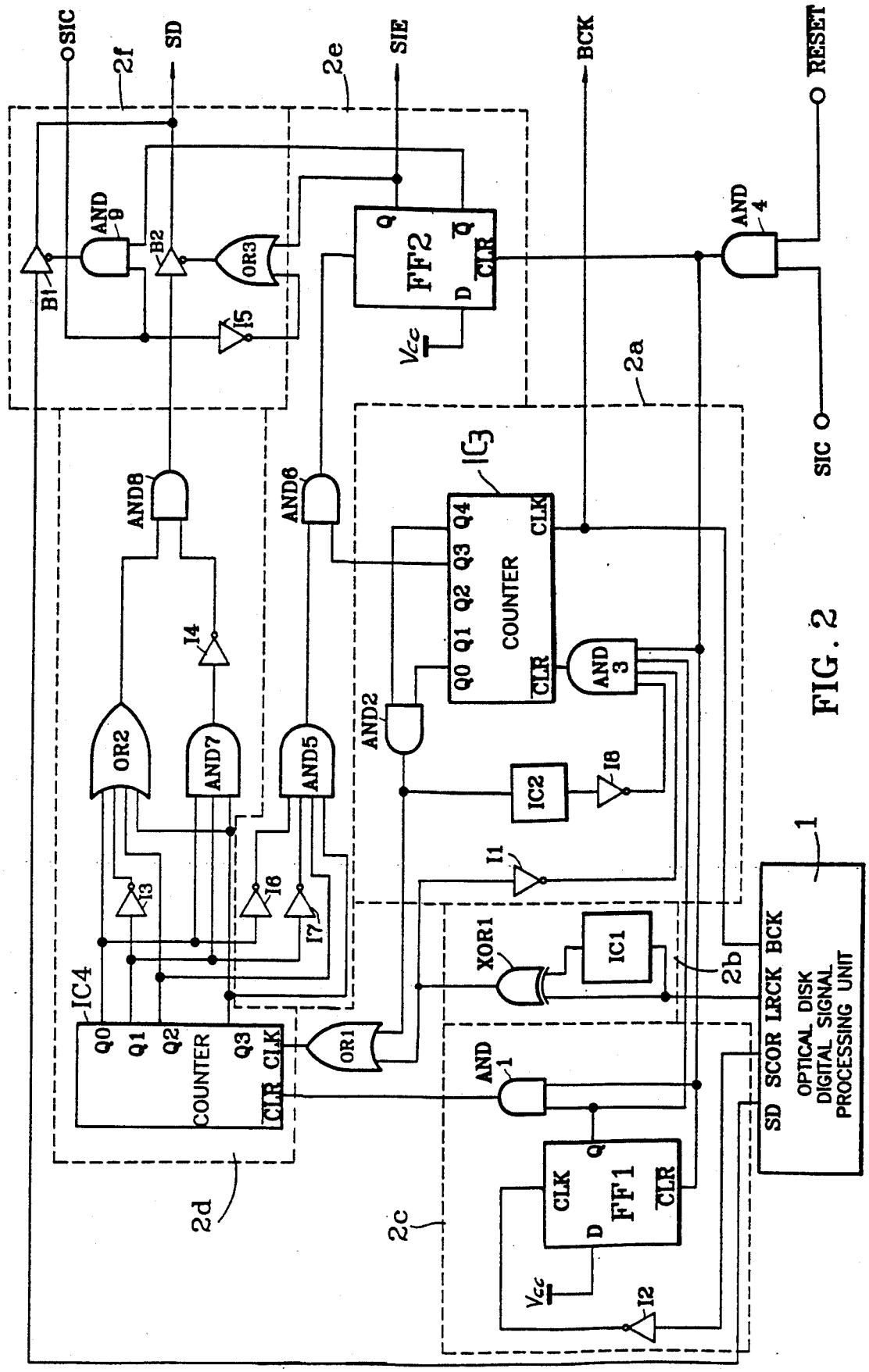
FIG. 2 is a schematic circuit diagram of a synchronizing pattern input controller shown in FIG. 1.

FIG. 2 is a schematic circuit diagram of the synchronizing pattern input controller 2 shown in FIG. 1. As shown in the drawing, the synchronizing pattern input controller 2 comprises a clock generator 2b including an integrator IC1 and an exclusive OR gate XOR1, for inputting the left and right clock LRCK signal outputted from the optical disk digital signal processor 1 to generate a clock signal in a desired timing: an AND gate AND4 for ANDing a reset signal $\overline{RESET}$ and the synchronizing pattern insert signal SIC from the microprocessor 4 to generate a clear signal; a counting unit 2a including a counter IC3, AND gates AND2 and AND3, inverter gates I1 and I8, and an integrator IC2, for counting 12 bytes of beat clock BCK outputted from the optical disk digital signal processor 1 in accordance with the level of clear signal from the AND gate AND4 and the level of clock signal from the clock generator 2b; an OR gate OR1 for ORing the output from the clock generator 2b and the output from the counting unit 2a to generate a clock signal; a timing controller 2c including a flip-flop FF1, an inverter gate I2 and an AND gate AND1, for inputting the sink signal SCOR from the optical disk digital signal processor 1 and the clear signal from the AND gate AND4 to produce a first synchronization, a synchronizing pattern generator 2d including a counter IC4, inverter gates I3 and I4, AND gates AND7 and AND8, and OR gate OR2, for generating 12 bytes of synchronizing pattern in accordance with the level of clear signal from the timing controller 2c and the level of clock signal from the OR gate OR1; a control signal generator 2e including inverter gates I6 and I7, AND gates AND5 and AND6, and a flip-flop FF2, for inputting count signal from the synchronizing pattern generator 2d, count signal from the counting unit 2a, and clear signal from the AND gate AND4 to generate a control signal and a synchronizing pattern end signal SIE; and a switching unit 2f including an inverter gate I5, an OR gate OR3, an AND gate AND9, and buffers B1 and B2, for being enabled or disabled in accordance with the control signal and the synchronizing pattern end signal SIE from the control signal generator 2e and the synchronizing pattern insert signal SIC from the microprocessor 4 to select the serial data SD from the digital signal processor 1 and the synchronizing pattern from the synchronizing pattern generator 2d.

Now, the operation of the system of the present invention configured as stated previously will be described in detail with reference to FIG. 3.

Figure 3A:
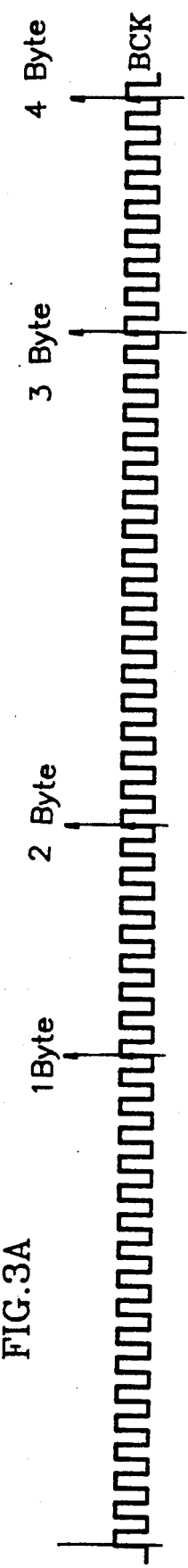
FIGS. 3A to 3C are views showing output waveforms of an optical disk digital signal processor.
Figure 3B:
Figure 3C:
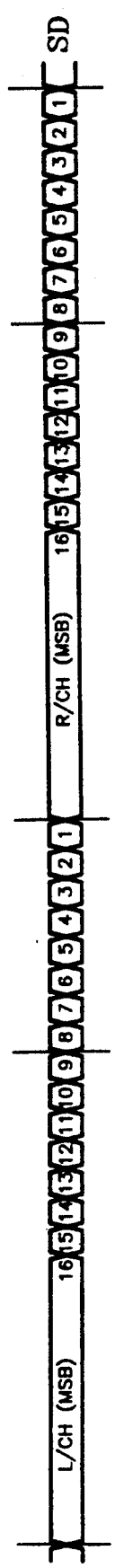

When the power is turned on and the reset signal RESET is applied, the optical disk digital signal processor 1 reads digital audio data CD-DA on the optical disk outputted from the disk pickup and processes the read digital audio data to apply the beat clock BCK, the left and right clock LRCK, the serial data SD and the sync signal SCOR as shown in FIGS. 3A to 3C to the switching unit 2f, the counting unit 2a, the clock generator 2b and the timing controller 2c, respectively.

At this time, the synchronizing pattern insert signal SIC being maintained at an inactive L state is applied from the microprocessor 4 via the AND gate AND4 to clear terminal $\overline{\text{CLR}}$ of the flip-flop FF1 in the timing controller 2c and clear terminal $\overline{\text{CLR}}$ of the flip-flop FF2 in the control signal generator 2e for clearing. Also, the synchronizing pattern insert signal SIC being inactive L state is applied from the microprocessor 4 via the AND gate AND4 to clear terminal CLR of the counter IC3 in the counting unit 2a and clear terminal $\overline{\text{CLR}}$ of the counter IC4 in the synchronizing pattern generator 2d for clearing. As a result, while the buffer B1 in the switching unit 2f is enabled at an initial state, the buffer B2 in the switching unit 2f is disabled at the initial state.

Consequently, the serial data SD from the optical disk digital signal processor 1 along with the beat clock BCK can not be inputted to the optical disk ROM decoder 3 through the buffer B1 in an appropriate timing.

Thereafter, the synchronizing pattern insert signal SIC being maintained at an active high H state is applied from the microprocessor 4 via the AND gate AND4 in the synchronizing pattern input controller 2 to clear terminal CLR of the flip-flop FF1 in the timing controller 2c, clear terminal CLR of the flip-flop FF2 in the control signal generator 2e and one input terminal of AND gate AND3 in the counting means 2a. On the other hand, while a high H pulse of the left and right clock LRCK is applied from the optical disk digital signal processor 1 to one input terminal of the exclusive OR gate XOR1, a low L pulse thereof is applied from the optical disk digital signal processor 1 via the integrator IC1 to the other input terminal of the exclusive OR gate XOR1, as shown in FIG. 3B. As a result, the high H pulse is outputted from the exclusive OR gate XOR1 in a moment (for a predetermined period of time that a capacitor of the integrator IC1 is to be charged with a current corresponding to the left and right clock LRCK), and then the low L pulse continues to be outputted from the exclusive OR gate XOR1.

The high H pulse outputted from the exclusive OR gate XOR1 is inverted into the low L pulse by the inverter gate I1, so that the inverted low L pulse is applied to other input terminal of the AND gate AND3. On the other hand, the sync signal SCOR outputted from the optical disk digital signal processor 1 is inverted into the high H pulse by the inverter gate I2, so that the inverted high H pulse is applied to clock terminal CLK of the flip-flop FF1. consequently, the high H pulse can be applied from output terminal Q of flip-flop FF1 to one input terminal of the AND gate AND1 and another input terminal of the AND gate AND3 in the counting unit 2a. On the other hand, data bytes "0,0,0,0,0" outputted from output terminals Q0-Q4 of the counter IC3 are ANDed by the AND gate AND2, and then are inverted into a high H pulse by inverter gate I8 through the integrator IC2, so that the inverted high H pulse is applied to another input terminal of the AND gate AND3. In result, the low L pulse outputted from the AND gate AND3 in counting unit 2a can be applied to clear terminal CLR of the counter IC3.

Therefore, data bytes "0,0,0,0,0" are outputted from output terminals Q0-Q4 of the counter IC3 since the counter IC3 can be cleared for the 16th clock period of the beat clock BCK output from the optical disk digital signal processor 1 as shown in FIG. 3A. Then, the output data bytes are ANDed by the AND gate AND2, and then are applied to clock terminal $\overline{\text{CLK}}$ of the counter IC4 in the synchronizing pattern generator 2d through the OR gate OR1.

On the other hand, the high H pulse outputted from output terminal Q of the flip-flop FF1 in the timing controller 2c and the high H pulse outputted from the AND gate AND4 are applied to clear terminal $\overline{\text{CLR}}$ of the counter IC4 as a high H pulse ANDed by the AND gate AND1 in the timing controller 2c. Consequently, 1 byte of the beat clock BCK can be counted by the counter IC4 in the synchronizing pattern generator 2d, and then data bytes 1,0,0,0 can be outputted from output terminals Q0-Q3 of the counter IC4.

At this time, the low L pulse outputted from output terminal Q1 of the counter IC4 is inverted into the high H pulse by the inverter gate I3, so that the inverted high H pulse along with the high H pulse outputted from output terminal Q0 is applied to one input terminal of the AND gate AND8 through the OR gate OR2. Also, signals outputted from terminals Q0, Q1 and Q3 of the counter IC4 are inverted into a high H pulse signal by the inverter gate I4 through the AND gate AND7, so that the inverted high H pulse is applied to the other input terminal of the AND gate AND8. Thus, the high H pulse is outputted from the AND gate AND8 to be applied to input terminal of the buffer B2.

On the other hand, the low L pulse is outputted from output terminals Q0-Q3 of the counter IC4 in the synchronizing pattern generator 2d through inverter gates I6 and I7 and AND gates AND5 and AND6 to be applied to clock terminal CLK of the flip-flop FF2 in the control signal generator 2e. Also, the high H pulse is outputted from the AND gate AND4 to which the synchronizing pattern insert signal SIC is inputted, so that it is applied to clear terminal $\overline{\text{CLR}}$ of the flip-flop FF2. As a result, the low L pulse is outputted from output terminal Q of the flip-flop FF2 to be applied to the OR gate OR3 to which the synchronizing pattern insert signal SIC is applied through the inverter gate I5. Thus, the low L pulse is applied to control terminal of buffer B2 in the switching unit 2f via the OR gate OR3, so that it enables the buffer B2.

Therefore, 1 byte of synchronizing pattern signal "1" outputted from the synchronizing pattern generator 2d can be applied to the optical disk ROM decoder 3 via the buffer B2. Thereafter, a second synchronizing pattern signal can be applied to the optical disk ROM decoder 3. Namely, the counter IC3 outputs data bytes 1,0,0,1,1 at output terminals Q0–Q4 thereof at the 25th leading edge of the beat clock BCK after it counts from the 17th leading edge of the beat clock BCK just next to edge of the left and right clock LRCK to the 24th leading edge of the beat clock BCK. If a second clock from the optical disk digital signal processor 1 is applied to clock terminal CLK of the counter IC4 through the associated AND gate AND2 and OR gate OR1, data bytes 0, 1,0,0 are outputted from output terminals Q0–Q3 to be applied to the AND gate AND8. As a result, the AND gate AND8 outputs the low L pulse causing a second byte "0" to be applied to the optical disk ROM decoder 3 via the enabled buffer B2 in the switching unit 2f.

When these procedures proceed until the edge of the left and right clock LRCK is generated 6 times, a 12th byte of the last synchronizing pattern is outputted, so that it can be applied to the optical disk ROM decoder 3.

Namely, the 12th synchronizing pattern can be applied to the optical disk ROM decoder 3. In other words, the counter IC3 outputs data bytes 1,0,0,1,1 at output terminals Q0–Q4 thereof at the 25th leading edge of the beat clock BCK after it counts from the 17th leading edge of the beat clock BCK just next to edge of the left and right clock LRCK to the 24th leading edge of the beat clock BCK. If a 12th clock from the optical disk digital signal processor 1 is applied to clock terminal CLK of the counter IC4 through the associated AND gate AND2 and OR gate OR1, data bytes 0,1,0,0 are outputted from output terminals Q0–Q3 to be applied to the AND gate AND8. As a result, the AND gate AND8 outputs the high H pulse causing the 12th byte "1" to be applied to the optical disk ROM decoder 3 via the enabled buffer B2 in the switching unit 2f. Also, data bytes 0,0,1,1 outputted from output terminals Q0–Q3 of the counter IC4 are inverted by inverter gates 16 and 17 in the control signal generator 2e, and then are ANDed by the AND gate AND5. Thus, the high H pulse is outputted from the AND gate AND5 to be applied to one input terminal of the AND gate AND6. On the other hand, the high H pulse is outputted from output terminal Q3 of the counter IC3 to be applied to the other input terminal of the AND gate AND6. In result, the high H pulse is outputted from the AND gate AND6, so that it can be applied to clock terminal CLK of the flip-flop FF2.

Therefore, the synchronizing pattern end signal SIE as the high H pulse is outputted from output terminal Q of the flip-flop FF2, so that it can inform the microprocessor 4 that inserting the synchronizing pattern has been completed. Also, this high H pulse is inputted to the OR gate OR3 to which the synchronizing pattern insert signal SIC is inputted, so that it can disable the buffer B2 in the switching unit 2f. Thus, the synchronizing pattern outputted from the synchronizing pattern generator 2d is blocked. On the other hand, the low L pulse outputted from output terminal Q of the flip-flop FF2 is applied to the AND gate AND9 along with the synchronizing pattern insert signal SIC in order to enable the buffer B1 in the switching unit 2f.

As a result, the optical disk ROM decoder 3 inputs the serial data outputted from the optical disk digital signal processor 1, only after it detects 12 bytes of synchronizing pattern outputted from the synchronizing pattern generator 2d.

While inserting the synchronizing pattern, data bytes 1,0,1,1,1,1,1,1,1,0,1 are outputted from the 4 bit counter. Thus, these data bytes can satisfy the synchronizing pattern "FF,OO,FF,FF,FF,FF,FF,FF,FF,FF,OO,FF".

Also, a means adapted to output to the microprocessor 4 the result that the synchronizing pattern has been inserted may be used as a means informing that inserting the synchronizing pattern has been completed.

As apparent from the above description, in accordance with the system of the present invention, data having no synchronizing pattern such as digital voice data loaded on the optical disk, which is outputted from the optical disk digital signal processor, can be normally inputted to the optical disk ROM decoder by the synchronizing pattern generated externally. Also, the synchronizing pattern can be inputted to the optical disk ROM decoder before th serial data stream is outputted from the optical disk digital signal processor.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A system for inserting a synchronizing pattern in digital audio data on an optical disk comprising:
    an optical disk digital signal processor for signal-processing digital audio data on the optical disk read from a disk pickup to output a serial data, a beat clock, a sync signal, and a left and right clock;
    a synchronizing pattern input control unit for generating the synchronizing pattern in accordance with a synchronizing pattern insert signal outputted from a microprocessor to control the serial data and the beat clock from said optical disk digital signal processor and indicate that inserting the synchronizing pattern has been completed; and
    an optical disk ROM decoder for detecting 12 bytes of synchronizing pattern generated from said synchronizing pattern input control unit to decode the serial data and the beat clock.

2. The system as claimed in claim 1, wherein said synchronizing pattern input control unit comprises a clock generator for detecting a timing of the left and right clock inputted from said optical disk digital signal processor to generate a clock in a desired timing; an AND gate (AND4) for ANDing a reset signal and the synchronizing pattern insert signal from said microprocessor; a counting unit for counting 12 bytes of beat clock inputted from said optical disk digital signal processor in accordance with output from said AND gate (AND4) and a clock pulse from said clock generator; an OR gate (ORI) for ORing output from said clock generator and output from said counting unit; a timing controller for inputting the sync signal from said optical disk digital signal processor and output from said AND gate (AND4) to produce a first synchronization, a synchronizing pattern generator for generating 12 bytes of synchronizing pattern in accordance with output from said timing controller and output from said OR gate (OR1): a control signal generator for inputting output from said synchronizing pattern generator, output from said counting unit and output from said AND gate (AND4) to output an enable/disable signal and a synchronizing pattern end signal; and a switching unit for being enabled and disabled in accordance with output from said control signal generator and the synchronizing pattern insert signal from said microprocessor to select the serial data from said digital signal processor and the synchronizing pattern from said synchronizing pattern generator.

3. The system as claimed in claim 2, wherein said cock generator includes an integrator (IC1) and an exclusive OR gate (XOR1) for XORing the left and right clock inputted directly and via said integrator (IC1) from said optical disk digital signal processor to generate the clock.

4. The system as claimed in claim 2, wherein said timing controller includes an inverter gate (I2) for inverting the sink signal from said optical disk digital signal processor, a flip-flop (FF1) for inputting output from said inverter gate (I2) at clock terminal thereof and output from said AND gate (AND4) at clear terminal thereof, and an AND gate (AND1) for ANDing output from said flip-flop (FF1) and output from said AND gate (AND4).

5. The system as claimed in claim 2, wherein said counting unit includes an integrator (IC2), an inverter gate (I8) for inverting output from said integrator (IC2), an inverter gate (I1) for inverting output from said clock generator, an AND gate (AND3) for ANDing output from said flip-flop (FF1), output from said AND gate (AND4) and output from said inverter gate (I1), a counter (IC3) for inputting output from said AND gate (AND3) at clear terminal thereof and the beat clock from said optical disk digital signal processor at clock terminal thereof, an AND gate (AND2) for applying outputs (Q0 and Q4) from said counter (IC3) to input of said AND gate (AND3) via said integrator (IC2) and inverter gate (I8) to count the beat clock.

6. The system as claimed in claim 2, wherein said synchronizing pattern generator includes an AND gate (AND7), an inverter gate (I4) for inverting output from said AND gate (AND7), a counter (IC4) for inputting output from said timing controller at clear terminal thereof and output from said OR gate (OR1) at clock terminal thereof, an inverter gate (I3) for inverting one output (Q1) from said counter (IC4), an OR gate (OR2) for ORing outputs (Q0, Q2 and Q3) from said counter (IC4) and output from said inverter gate (I3), and an AND gate (AND8) for ANDing output from said OR gate (OR2) and output from said inverter gate (I4) to generate 12 bytes of synchronizing pattern.

7. The system as claimed in claim 2, wherein said control signal generator includes inverter gates (I6 and I7) for inverting outputs (Q0 and Q1) from said counter (IC4) respectively, an AND gate (AND5) for ANDing outputs from said inverter gates and outputs from said counter (IC4), an AND gate (AND6) for ANDing output from said AND gate (AND5) and output from said counter (IC3), and a flip-flop (FF2) for inputting output from said AND gate (AND6) at clock terminal thereof and output from AND gate (AND4) at clear terminal to output the enable signal and the synchronizing pattern end signal.

8. The system as claimed in claim 2, wherein said switching unit includes an inverter gate (I5), an AND gate (AND9) for ANDing output (Q) from said flip-flop (FF2) and the synchronizing pattern signal, an OR gate (OR3) for ORing an output (Q) from said flip-flop (FF2) and the synchronizing pattern signal inverted by said inverter gate (I5), and buffers (B1 and B2) for being enabled respectively by outputs from said AND gate (AND9) and OR gate (OR3) to select the serial data from said optical disk digital signal processor and the synchronizing pattern from said synchronizing pattern generator.

* * * * *